(No Model.) 2 Sheets—Sheet 2.
J. W. BURGESS.
ROTATING SCREEN FOR SCREENING KAOLIN OR ANALOGOUS SUBSTANCES.
No. 493,751. Patented Mar. 21, 1893.
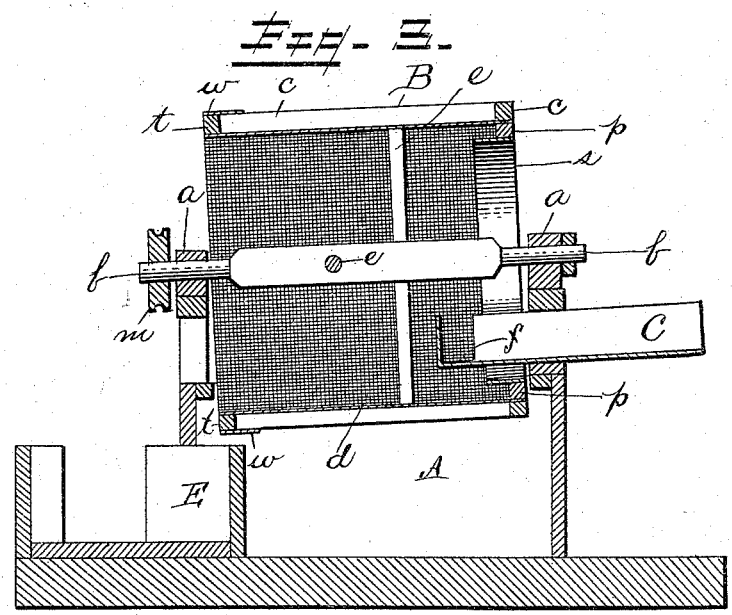
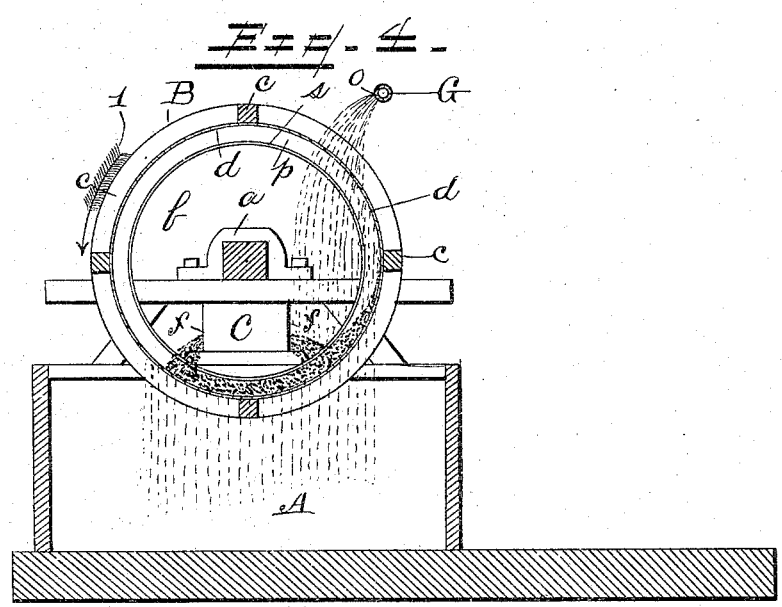
Witnesses
Albert B. Blackwood
Carleton E. Snell
Inventor
John W. Burgess
by
his Attorney

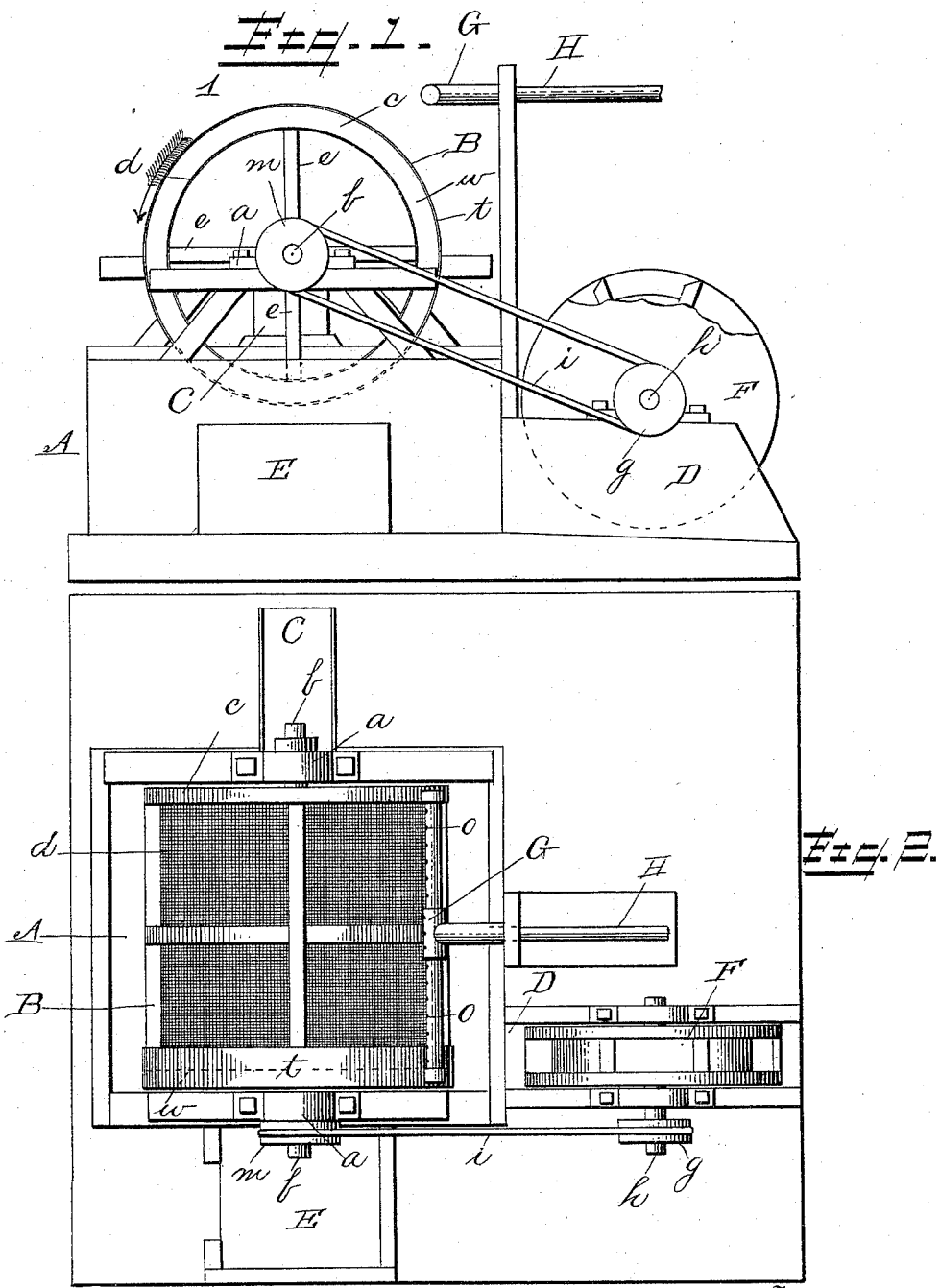

UNITED STATES PATENT OFFICE.

JOHN W. BURGESS, OF HOCKESSIN, DELAWARE.

ROTATING SCREEN FOR SCREENING KAOLIN OR ANALOGOUS SUBSTANCES.

SPECIFICATION forming part of Letters Patent No. 493,751, dated March 21, 1893.

Application filed October 31, 1891. Serial No. 410,461. (No model.)

*To all whom it may concern:*

Be it known that I, JOHN W. BURGESS, of Hockessin, in the county of New Castle and State of Delaware, have invented certain new and useful Improvements in Rotating Screens for Screening Kaolin and Analogous Substances, of which the following is a specification.

In the preparation of kaolin or porcelain clay for rendering it suitable for the manufacture of pottery ware, the natural clay is pulverized and mixed with water. The mixed clay and water is then passed through a cleaner which removes all the coarser and heavier foreign matters. The clay is then in a condition in which it is strongly associated with the water, and is then known as "clay-slip." The clay-slip, however, contains a considerable percentage of impurities, such as mica and fine sand. The mica contained in the clay-slip usually exists in the shape of fine flakes. All of these impurities are, however, coarser than the particles of suspended clay in the clay-slip, and are separable from the clay by the employment of sieves of suitable mesh. Heretofore it has been customary to convey the clay-slip to and through a series of substantially horizontal sieves for the removal of the impurities. These sieves are composed of suitable frames supporting a suitable screening or lawning material which is ordinarily either silk cloth, or fine wire gauze, the fine copper gauze, known as 100-wire gauze (having fifty strands each way to the inch) being that preferably employed. In practice, however, serious objections arise in the employment of these usual screens. They rapidly clog up in use, (the flat flakes of mica contributing particularly to this result) so that it is necessary every little while to stop the flow of the clay-slip to cleanse them. The cleansing is done by shoveling out the accumulated clay and intermingled impurities. This cleansing results in frequent injury to the expensive gauze or silk employed, (necessitating its replacement, since the occurrence of a single hole renders the whole screen useless;) the clay accumulating in the sieves is thrown out and either is lost or requires being again subjected to the initial treatment; the process is retarded; and the attention of a workman is constantly required at the screens.

The only instance, as far as I am aware, in which any improvement upon the ordinary horizontal screens has heretofore been made, is to be found in Letters Patent of the United States, granted to Simeon G. Phillips, dated January 24, 1882, No. 252,796. According to this patent a rotary screen is employed into which clay-slip passes, and through which the fine clay passes. The coarse impurities remain in the interior face of the screen, and when carried to the highest part of the travel of the screen encounter there a shower of water which washes them off the screen into a separate stationary trough within the screen, which conveys the impurities away. This patented screen is an improvement upon the old-style horizontal screens, but in practice such a screen proves to but partially instead of wholly overcome the objections to the old-style screens. Not all of the fine clay in the clay-slip passes at once through the screen and more or less of it is carried upwardly with the impurities, and is washed into the impurity trough. Thus a considerable quantity of the clay is lost. The rotary screen also requires a somewhat careful regulation of the quantity of the water showered onto the screen. If too little water is used, not all the clay and impurities adhering to the screen will be washed into the impurity discharge trough, which results in the eventual clogging of the screen, and its stoppage for cleansing purposes. If, on the other hand, the supply of water is too copious the impurities are washed over the discharge trough and fall back into the screen, since owing to the construction and mode of operation of the patented screen the impurity discharge trough is necessarily shallow, and within the screen.

The present invention seeks to overcome the objections to the prior straining methods, and resembles the Phillips screen in so far as to employ a rotary screen, but in other respects the mode of operation of the screen and its construction are radically different from the Phillips screen.

The present improved rotary kaolin screen is illustrated in the accompanying drawings, wherein—

Figure 1, is a side view of the improved screen. Fig. 2, is a plan view thereof. Fig. 3, is a longitudinal section in the plane indicated by the line 3—3 in Fig. 2. Fig. 4, is a transverse section in the plane indicated by the line 4—4, in Fig. 2.

A, is a tank constituting a receiver for the screened material, which supports bearings *a, a,* for the shaft *b,* of the elevated rotary screen B. The screen is composed of a framework *c,* secured to the shaft *b,* and carrying on its interior the wire gauze or silk cloth *d,* constituting the screening material. The only obstructions to the smooth interior surface of the screen are the ends of the spokes *e* connecting the outer framework *c* to the shaft *b.* The axis of the screen is slightly inclined from its inlet to its outlet ends and both ends of the screen are open. Extending into the upper inlet end of the screen is a spout C, which delivers the clay-slip to the interior of the screen. This spout C discharges into the screen through side outlets *f f,* instead of directly ahead. This arrangement is adopted in order to retard the flow of the clay-slip down the inclined bottom or lowest portion of the screen.

The fine clay and water entering the screen fall through the meshes of the screen into the receiver A, below, and from thence are conveyed by conduit D, to the settling tanks. The screen is elevated a sufficient distance above the receiver A, to enable the clay and water to pass freely through the receiver unimpeded by the clay and water, which may have collected in the receiver. The coarse particles and other impurities in the clay-slip, do not pass through the screen, but pass down the inclined bottom of the screen, and pass out through the lower outlet end of the screen outside of the receiver A, and into a suitable conduit or receptacle E.

The rotary screen B, is rotated slowly by any suitable means. The drawings illustrate a convenient and economical means of rotation. A small undershot water wheel F, is journaled in the conduit D, so as to be rotated by the screened clay-slip passing therethrough. A pulley *g,* on the shaft *h,* of said water wheel F, is connected by drive band, cord, or chain *i,* to a drive pulley *m,* on the shaft *b,* of the rotary screen, whereby the screen is rotated in the direction of the arrow 1, in Figs. 1 and 4. Ordinarily there is sufficient difference in level between the receiver A and the settling tanks, and sufficient copiousness in the amount of clay and water passing through the conduit D, to rotate the screen B, at the slow rate of rotation which is desired. This, consequently, affords a convenient and efficient means for rotating the screen, without maintaining any special additional motive power. In case, however, the conditions as to level, and copiousness of water are insufficient, the screen may be rotated by connection with any suitable source of power.

Arranged adjacent to the upwardly moving side of the screen B, and exterior thereto, is a water discharge G. This water discharge consists in a pipe G, which extends parallel with the axis of the screen, approximately at the level of the top of the screen, and it is provided with a series of substantially horizontal discharge orifices, *o,* throughout its entire length which discharge water onto the upper side of the exterior of the screen. The water is supplied to the water discharge G, through a supply pipe H. The water should not be under excessive pressure, but should simply fall upon the exterior of the screen and throughout its length.

The utility and function of the water shower furnished by the discharge G, will become evident on consideration of the entire screening operation. The clay-slip entering the screen falls onto the inner surface of the screen at its upper end, and flows both through the screen and down the same. The water and the very finest particles of the clay fall through the screen into the receiver below, while the coarser particles and impurities fail to pass through, and tend to clog the meshes of the screen. This tendency to clog the screen is the greatest on the portions of the screen alongside the lowest portions of the screen, where the depth and pressure are slightest, and at this portion of the screen a considerable portion of the fine clay fails to pass through the screen. The clay oozes, rather than falls, through the screen, and it tends through capillary attraction to adhere to the outer face of the screen. The rotation of the screen serves however, to retard the clogging of the screen by the failure of the fine clay to pass through, by keeping in motion the clay-slip falling into the screen. Nevertheless, in the absence of the water-shower, the screen would eventually clog up, but less quickly than in the case of a non-rotary screen. In the improved screen, however, as the fine clay which adheres to the meshes of the screen is carried upwardly by the rotation of the screen it encounters the shower of water. This water shower trickles down both the inside and outside of the screen to some extent, but the larger proportion of it falls directly downwardly through the screen and falls on to the inner, upwardly-rising side of the screen, where it encounters the clay adhering to the meshes of the screen. The water shower washes this fine clay through the screen into the receiver, washes off into the receiver any clay adhering to the screen on its exterior, and washes back any impurities into the lower part of the screen. The water shower thus constantly keeps clear the ascending portion of the screen, so that the screen is always clean and unobstructed when it passes into the entering clay-slip at the lowest portion of the screen. Since the water shower enters the screen throughout the entire length thereof, it not only keeps the screen clear of the fine clay and washes the fine clay into the receiver below, but it also aids the progress of the coarse impurities down the incline of the screen into the impurity receptacle E. With a screen of proper size, and with the volume of the water shower properly proportioned to the volume of clay-slip, the screen is entirely self-cleaning, and the fine clay is entirely separated from the impurities in the upper two-thirds of the length of the screen. I have employed, in actual use, a screen three feet long and three feet in diameter, with an inlet spout C, twelve inches wide by six inches high, and a water supply pipe H, one and a half inches in diameter. Should the water shower be excessive and unnecessarily great, no harm could result.

The differences between this improved screen and the screen of the Phillips patent, No. 252,796, are apparent. In my screen the inclination of the screen and the free outlet at the lower end permit the direct discharge of the impurities without the necessity of a special discharge trough in the upper part of the screen. The object of the water shower in the Phillips screen is to wash off the impurities which have been carried to the upper part of the screen into the special discharge trough, whereas, in my screen the main function of the water shower, is to insure the passage of the fine clay through the screen, keeping the screen clear by washing the fine clay through and off from the screen, instead of washing it back into the screen. The water shower, in my screen, only incidentally assists in the discharge of the impurities.

In order to prevent any of the unscreened clay-slip passing through the upper open end of the screen directly into the receiver A, an inwardly projecting peripheral rim $p$, is provided around the upper open end of the screen to which is secured a metallic band $s$, (preferably of galvanized sheet-iron) which projects within the screen parallel with the screening material $d$, as shown. Any of the clay-slip flowing backwardly up the screen encounters the band $s$, and rim $p$, and is thereby prevented from flowing over the upper margin of the screen into the receiver A. Similar provisions are applied to the lower open end of the screen to prevent the passage of any of the screened clay into the impurity receptacle E. To an outwardly projecting peripheral rim $t$ (which is conveniently a portion of the framework of the screen) is secured a metallic band $w$ (of galvanized sheet iron) which projects upwardly parallel with and exterior to the screening material $d$, and beyond the mouth of the receptacle E, so that any of the screened clay falling onto band $w$, is discharged into the receiver A.

This improved screen can be used for screening the other materials used in the manufacture of pottery ware.

I claim as my invention—

1. An elevated rotary inclined screen and a receiver below the same which receives the material dropping through said screen, in combination with a water discharge at one side of said screen which showers water onto the upwardly rising portion of the screen, substantially as set forth.

2. An elevated rotary inclined screen open at its lower end, a spout which delivers clay-slip into its interior at its upper end, a receiver below said screen which receives the material dropping through said screen, and a receptacle which receives coarse matters and impurities from the lower end of the screen, in combination with a water discharge at one side of said screen which showers water onto the exterior of the upwardly rising portion of the screen, substantially as set forth.

3. An elevated rotary inclined screen open at its lower end and having the screening material on the interior of its framework, a spout which delivers clay slip into its interior at its upper end, a receiver below said screen which receives the material passing through said screen, said screen delivering the coarse matters and impurities at its lower end outside of said receiver, in combination with a water discharge at one side of said screen and above its middle, said water discharge extending lengthwise of said screen and showering water onto the exterior of the upwardly-rising portion of the screen, substantially as set forth.

4. An elevated rotary inclined screen open at its lower end, a spout which delivers clay-slip into its interior at its upper end, a receiver below the screen, and a receptacle which receives coarse matters and impurities from its lower end, in combination with a water discharge consisting of a pipe extending longitudinally and at one side of the screen, and having a series of discharge orifices throughout its length which shower water onto the exterior of the upwardly rising portion of the screen, substantially as set forth.

In witness whereof I have hereunto signed my name in the presence of two subscribing witnesses.

JOHN W. BURGESS.

Witnesses:
THOS. J. BOWEN, Jr.,
HENRY J. CRIPPEN.